(12) United States Patent
Pedro et al.

(10) Patent No.: US 10,700,777 B2
(45) Date of Patent: Jun. 30, 2020

(54) METHOD AND SYSTEM FOR ASSIGNING PERFORMANCE INDICATORS TO OBJECTS OF A NETWORK

(71) Applicant: Xieon Networks S.a.r.l., Senningerberg (LU)

(72) Inventors: João Pedro, Lisbon (PT); Rui Morais, Gouveia (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 48 days.

(21) Appl. No.: 15/540,906

(22) PCT Filed: Dec. 18, 2015

(86) PCT No.: PCT/EP2015/080434
§ 371 (c)(1),
(2) Date: Jun. 29, 2017

(87) PCT Pub. No.: WO2016/107757
PCT Pub. Date: Jul. 7, 2016

(65) Prior Publication Data
US 2017/0373750 A1    Dec. 28, 2017

(30) Foreign Application Priority Data

Jan. 2, 2015   (EP) .................................... 15150024

(51) Int. Cl.
*H04B 10/079*       (2013.01)
*H04Q 11/00*        (2006.01)
(Continued)

(52) U.S. Cl.
CPC ..... *H04B 10/0793* (2013.01); *H04B 10/0795* (2013.01); *H04B 10/27* (2013.01);
(Continued)

(58) Field of Classification Search
None
See application file for complete search history.

(56) References Cited

U.S. PATENT DOCUMENTS

| 7,269,157 B2 * | 9/2007 | Klinker | H04L 41/0816 |
| | | | 370/228 |
| 2009/0138618 A1 * | 5/2009 | Li | H04L 67/104 |
| | | | 709/242 |

(Continued)

FOREIGN PATENT DOCUMENTS

| WO | 2013/023698 A1 | 2/2013 |
| WO | 2013/110320 A1 | 8/2013 |

OTHER PUBLICATIONS

International Preliminary Report on Patentability, PCT/EP2015/080434, dated Jul. 13, 2017, 9 pages.
(Continued)

*Primary Examiner* — Steve R Young

(57) ABSTRACT

A method of assigning performance indicators to objects of a network employing a computation to assign performance indicators to said objects of said network such that a sum of said performance indicators of objects along a given path in said network in relation to a first threshold value indicates whether said path fulfils a predetermined criterion, and/or indicates whether said path does not fulfil said predetermined criterion.

A method of evaluating a performance of a path in a network based on the performance indicators involves the steps of calculating a sum of performance indicators for said objects along said path and evaluating a performance of said path by comparing said sum against a first threshold value.

20 Claims, 7 Drawing Sheets

(51) Int. Cl.
  *H04L 12/24*     (2006.01)
  *H04J 14/02*     (2006.01)
  *H04B 10/27*     (2013.01)
  *H04L 12/721*    (2013.01)
  *H04L 12/26*     (2006.01)

(52) U.S. Cl.
  CPC ........ *H04J 14/0271* (2013.01); *H04L 41/145* (2013.01); *H04Q 11/0066* (2013.01); *H04L 43/16* (2013.01); *H04L 45/12* (2013.01); *H04L 45/62* (2013.01); *H04Q 2011/0016* (2013.01); *H04Q 2011/0073* (2013.01); *H04Q 2011/0083* (2013.01)

(56) References Cited

U.S. PATENT DOCUMENTS

| | | | | |
|---|---|---|---|---|
| 2011/0063979 | A1* | 3/2011 | Matthews | H04L 45/302<br>370/237 |
| 2012/0060142 | A1* | 3/2012 | Fliess | G06F 8/70<br>717/102 |
| 2015/0215032 | A1* | 7/2015 | Bevilacqua | H04J 14/0267<br>398/5 |

OTHER PUBLICATIONS

International Search Report and Written Opinion, PCT/EP2015/080434, dated Feb. 25, 2016, 15 pages.

"Redefining Transport Networks for Hypergrowth & Dynamic Cloud Connectivity", Coriant, 2014, pp. 1-6, XP055190327, Retrieved from the Internet: URL:http://www.coretelecom.net/media/pdf/Coriant%20Company%20Overview.pdf [retrieved on May 20, 2015].

\* cited by examiner

METHOD AND SYSTEM FOR ASSIGNING PERFORMANCE INDICATORS TO OBJECTS OF A NETWORK

CROSS REFERENCE TO RELATED APPLICATIONS

This application is a 35 U.S.C. 371 national stage filing of International Application No. PCT/EP2015/080434, filed on Dec. 18, 2015, which claims priority to European Patent Application No. 15150024.6 filed on Jan. 2, 2015. The contents of the aforementioned applications are hereby incorporated by reference in their entireties.

FIELD OF THE INVENTION

The invention relates to the evaluation of performance in a network, in particular in an optical network.

BACKGROUND OF THE INVENTION

When a service is established in an optical network, a light path between the source of a signal and a destination node/nodes of a service needs to be computed. A light path may traverse a sequence of network objects connected by optical waveguides between the source and the destination node through which optical signals can travel. As the optical signal traverses the optical network objects, its quality may degrade due to the physical impairments imposed. Various optical performance parameters for measuring the optical signal quality exist, such as the optical signal to noise ratio (OSNR). If the OSNR is maintained above a given threshold, the correct detection of the optical signal is feasible. Otherwise, the light path is assumed to be unfeasible. An unfeasible light path may be made feasible by means of restoration of the distorted signals such as by means of 3R regeneration (comprising a re-shaping, a re-amplification and a re-timing of the distorted signal). However, 3R regeneration requires an intermediate node with optical-to-electrical-to-optical conversion capabilities and hence enhances the complexity and cost of the network. Network operators therefore try to reduce the number of transponders and 3R regenerators in the network, which requires a careful and accurate estimation of the optical performance and feasibility of light paths already at the planning stage and also during network operation. Transponders may be understood to realize "electrical-to-optical conversion" at the start node and "optical-to-electrical conversion" at the end node, whereas 3R regenerators perform "optical-to-electrical-to-optical conversion" at an intermediate node.

During network operation, the service setup time should be small and the control plane needs to be capable of quickly considering multiple paths using different 3R placement solutions, such as to restore the network service in case of sudden interruptions of individual network links or to establish a new service.

Optical performance estimation generally involves the assessment of the quality of the data channel and depends on a variety of aspects, such as the physical parameters of the network objects, the length of the optical multiplexing sections (OMS), the type of fibers that are used, the bit rate, the modulation format, wavelength, the type and number of channels, etc. The estimation of the optical performance of a given light path hence involves complex and time consuming computations. This poses challenges both for offline network planning and for online network restoration and/or operation.

Two approaches are conventionally used to estimate the optical performance and to check the feasibility of a light path: (i) a posteriori assessment via running a simulation or another optical performance model, and (ii) a priori assessment by computing all possible light paths in advance. However, both techniques have significant drawbacks. A posteriori calculation during routing is very time-consuming and generally makes use of various approximations to speed up the computation, which can introduce inaccuracies, thereby potentially making both single-layer and multi-layer planning inaccurate. A priori calculation is less time-consuming during routing, at the expense of additional offline computation effort in advance. However, the amount of information that needs to be (firstly) imported and (secondly) processed and utilized can be significant. Usually, large databases are needed in the form of a list or a reachability graph, and assembling and searching in the list/graph per routing instance is required, which slows down the routing process.

In summary, an assessment of the optical performance with high accuracy involves significant computational effort and huge amounts of stored data. Conversely, reducing the computational effort and the amount of data generally implies a loss of accuracy.

What is needed is an improved technique for optical performance estimation that is both accurate and requires less computational and storage resources.

OVERVIEW OF THE INVENTION

This objective is achieved with a method and system according to the present invention.

The method of assigning performance indicators to objects of a network according to the present invention involves a step of determining a first set of paths in said network, each said path comprising a plurality of interconnected objects of said network, wherein said first set comprises paths that fulfil a predetermined criterion. The method further comprises a step of determining a second set of paths in said network, each said path comprising a plurality of interconnected objects of said network, wherein said second set comprises paths that do not fulfil said predetermined criterion. The method further comprises a step of assigning performance indicators to said objects of said network by means of a computation that is based on said first set of paths and said second set of paths such that a sum of said performance indicators of objects along a given path in relation to a first threshold value indicates whether said given path fulfils said predetermined criterion, and/or indicates whether said given path does not fulfil said predetermined criterion. The method according to the invention may be understood as a compression technique that converts the information content contained in said first set of paths and said second set of paths into an alternative formulation or representation in terms of performance indicators that are assigned to individual objects in said network. This conversion may preferably be achieved by means of a linear optimization algorithm. The optimization may likewise yield said first threshold value. For any given light path, summing up the performance indicators of the objects in said light path and comparing with said first threshold value provides a computationally simple and quick way to check whether said given path fulfils said predetermined criterion, and/or whether said given path does not fulfil said predetermined criterion.

The steps of determining said first set of paths and determining said second set of paths in said network as well as the linear optimization and assigning of performance indicators to said objects in said network may be performed off-line during the planning stage of the network. These steps yield a set of performance indicators attributed to said objects of said network. Said performance indicators may be real numbers and hence require much less storage resources than the full set of feasible light paths.

Once an event occurs in the network where routing becomes necessary, feasibility of paths may be checked quickly by summing up the performance indicators of the respective network objects in the light paths and comparing with said first threshold value. This requires only relatively few computational resources, and hence can be done quickly and efficiently during the network operation.

Said method may comprise a step of determining said performance indicators by means of said computation before assigning said performance indicators to said objects.

Said computation may involve a linear optimization.

Linear optimization, sometimes called linear programming, is generally known as a method in mathematical optimization theory in which the model requirements are represented by linear relationships. More formally, linear optimization may be understood as a technique for the optimization of a linear objective function subject to linear equality and/or linear inequality constraints.

A network, in the sense of the present invention, may be an optical network, but may likewise be any other network suitable for signal and/or information transmission in which signal quality degrades, such as an electrical network.

Network objects, in the sense of the present invention, may be any components of the network. In particular, these may be (active or passive) components that have an effect on the information and/or data transmission in the network, such as components that affect the signal quality.

In case the network is an optical network, network objects may comprise active or passive components, including both network elements and network links, such as optical multiplexing sections (OMS), optical fibers, wave division multiplexers/demultiplexers, switches or splitters, or any other kind of network component or network element that may introduce signal degradations that may affect an optical performance metric, such as the optical signal-to-noise ratio (OSNR).

In general, said network may be represented in terms of a graph. Said network objects may be represented in terms of nodes or links of said graph.

A path in said network may be understood as a sequence or chain of interrelated or linked network objects in said network.

Said predetermined criterion may be any criterion relating to or characterizing a signal or data transmission along said path.

In particular, said path may fulfil said predetermined criterion in case said path is suitable for signal transmission according to said predetermined criterion, and/or said path may not fulfil said criterion in case said path is not suitable for signal transmission according to said predetermined criterion.

Said criterion may in particular relate to or involve an optical performance metric, such as OSNR.

In a preferred embodiment, said first set of paths is a subset of all the paths in the network that fulfil said predetermined criterion.

Similarly, said second set of paths may be a subset of all the paths in the network that do not fulfil said predetermined criterion In a preferred embodiment, said given path fulfils said predetermined criterion if said sum of said performance indicators of objects along said path is below said first threshold value, or if said sum of said performance indicators of objects along said path is above said first threshold value.

There are usually various alternative or equivalent ways in which the computation can be cast in mathematical terms. In particular, the relation may depend on how the computation, in particular the linear optimization problem, is formulated.

Additionally or alternatively, in an embodiment said given path does not fulfil said predetermined criterion if said sum of said performance indicators of objects along said path is above said first threshold value, or if said sum of said performance indicators of objects along said path is below said first threshold value.

The computation according to the present invention may yield a first threshold value that provides a sharp separation between paths in said first set and paths in said second set. This is a particularly advantageous configuration, in the sense that it allows to uniquely assign either the first set or the second set to a given path based on a comparison with a single first threshold value.

However, in other embodiments the method further comprises a step of determining a second threshold value by means of said computation, wherein a sum of said performance indicators of objects along a given path in relation to said first threshold value indicates whether said path fulfils said predetermined criterion, and wherein a sum of said performance indicators of objects along a given path in relation to said second threshold value indicates whether said path does not fulfil said predetermined criterion, or vice versa.

Said second threshold value may be different from said first threshold value.

In a preferred embodiment, said first set of paths is a set of paths that cannot be lengthened in said network without failing to fulfil said predetermined criterion.

Hence, said first set of paths may be the set of the longest paths that fulfil said predetermined criterion.

Said second set of paths may be a set of paths that cannot be shortened in said network without fulfilling said predetermined criterion.

Hence, said second set of paths may be the set of the shortest paths that do not fulfil said predetermined criterion.

Assigning the first set of paths and the second set of paths according to these embodiments avoids redundancies in the computation, in particular the linear optimization and hence reduces the computational effort required for assigning the performance indicators.

In a preferred embodiment, the method comprises a step of storing said assigned performance indicators for said objects.

A routing algorithm may check whether a given path is feasible simply by reverting to the stored performance indicators, computing their sum along the given path and comparing with the respective threshold value.

In a preferred embodiment, said computation is of the form $$\min \Delta \qquad (1)$$
$$\Sigma_n \alpha_n \leq T_1 + \Delta, \ \Sigma_m \alpha_m \geq T_1,$$

wherein $\{\alpha_n\}$ denotes a set of said performance indicators attributed to objects $\{1, \ldots, N\}$, wherein the sum $\Sigma_n \alpha_n$ is over all paths in said first set, and wherein the sum $\Sigma_m \alpha_m$ is over all paths in said second set, and wherein $T_1$ denotes said first threshold. $\Delta$ is the objective function. A more complete description of the optimization will be given in Eq. (2) below in conjunction with the description of the preferred embodiments.

$T_2 = T_1 + \Delta$ may be understood to denote said second threshold value, and the computation strives to minimize the difference between $T_1$ and $T_2 = T_1 + \Delta$.

In case $\Delta = 0$, the optimization yields a single threshold value, and paths can be checked to belong either to the first set of paths or to the second set of paths uniquely based on a comparison of the sum of the respective performance indicators with said single threshold value.

The previous embodiments were concerned with methods of assigning the performance indicators to objects in the network. However, in a preferred embodiment the method also comprises the calculation steps for evaluating the performance of a given path. In this embodiment, the method involves the steps of calculating a sum of said assigned performance indicators for said objects along said given path and evaluating a performance of said given path by comparing said sum against said first threshold value and/or against said second threshold value.

Evaluating a performance of a path in a network constitutes a second independent aspect of the invention. In this second aspect, the invention relates to a method for evaluating a performance of a path in the network, said path comprising a plurality of interconnected objects in said network, wherein performance indicators are assigned to said objects, said method comprising the steps of calculating a sum of performance indicators for said objects along said path, and evaluating a performance of said path by comparing said sum against a first threshold value.

In a preferred embodiment, said step of evaluating said performance comprises a step of determining whether said path fulfils a predetermined criterion by comparing said sum against said first threshold value, and/or determining whether said path does not fulfil said predetermined criterion by comparing said sum against said first threshold value.

Said step of evaluating said performance may, alternatively or additionally, also comprise a step of determining whether said path does not fulfil said predetermined criterion by comparing said sum against a second threshold value, and/or determining whether said path fulfils said predetermined criterion by comparing said sum against said second threshold value.

As described with respect to the embodiments above, said path may fulfil said predetermined criterion in case said path is suitable for signal transmission according to said predetermined criterion.

Similarly, in a preferred embodiment said path does not fulfil said criterion in case said path is not suitable for signal transmission according to said predetermined criterion.

In a configuration in which the computation, in particular the linear optimization yields a first threshold value and a second threshold value, said step of evaluating said performance of said path may comprise a step of reverting to a performance listing if said sum is in between said first threshold value and said second threshold value.

Said performance listing may comprise performance parameters of those paths whose sum of performance indicators is in between said first threshold value and said second threshold value, and hence may not allow a reliable assignment to either said first set or said second set based on the performance indicators alone.

Reverting to a separate performance listing provides an efficient way of dealing with these paths.

In said method of evaluating a performance of a path in a network according to the second aspect, said performance indicators may be determined according to the method of the first aspect of the invention.

In the first aspect, the invention further relates to a system for assigning performance indicators to objects of a network, comprising means for determining a first set of paths in said network, each said path comprising a plurality of interconnected objects of said network, wherein said first set comprises paths that fulfil a predetermined criterion. Said system further comprises means for determining a second set of paths in said network, each said path comprising a plurality of interconnected objects in said network, wherein said second set comprises paths that do not fulfil said predetermined criterion.

Said system further comprises means for assigning performance indicators to said objects of said network by means of a computation that is based on said first set of paths and said second set of paths, such that a sum of said performance indicators of objects along a given path in relation to a first threshold value indicates whether said given path fulfils said predetermined criterion, and/or indicates whether said given path does not fulfil said predetermined criterion.

Said system may be adapted to perform a method with some or all of the features described above in connection with the first aspect.

In a preferred embodiment, the system further comprises means for calculating a sum of said assigned performance indicators for said objects along said given path as well as means for evaluating a performance of said given path by comparing said sum against said first threshold value.

In the second aspect, the invention also relates to a system for evaluating a performance of a path in a network, said path comprising a plurality of interconnected objects in said network, wherein performance indicators are assigned to said objects, said system comprising means for calculating a sum of performance indicators for said objects along said path, as well as means for evaluating a performance of said path by comparing said sum against a first threshold value.

Said system may be adapted to perform a method with some or all of the features described above in connection with the second aspect of the invention.

Said system may further comprise a storage unit for storing said performance indicators for said objects.

The invention further relates to a computer program or computer program product comprising computer-readable instructions, wherein said computer-readable instructions, when read on a computing device connected to a system with some or all of the features described above implement on said computing device a method with some or all of the features described above.

DETAILED DESCRIPTION OF PREFERRED EMBODIMENTS

The features and numerous advantages of the method and system according to the present invention will be best apparent from a detailed description of preferred embodiments with reference to the accompanying drawings, in which.

The invention will now be described with reference to an optical network in which light signals are employed to transfer data between nodes via optical communication channels, such as optical fibers. However, this is merely one example of a network in which the present invention can be employed. In general, the invention can be used in any network for signal or data transmission.

In the optical network example that follows, the objects of the network to which performance indicators are assigned are network connections or network links that may comprise optical fibers and connect network elements such as wavelength division multiplexers or demultiplexers, optical switches, or splitters. However, this is merely an example. In more generality, network objects in the sense of the present invention may be understood to encompass any network equipment or network component, either passive or active, that may degrade the signal quality of optical signals traversing the network. Hence, network objects may include optical network connections such as fiber links, but also any other kind of device that can be employed in an optical network, such as network elements, in particular wavelength division multiplexers or demultiplexers, optical switches, or splitters.

Figure 1:
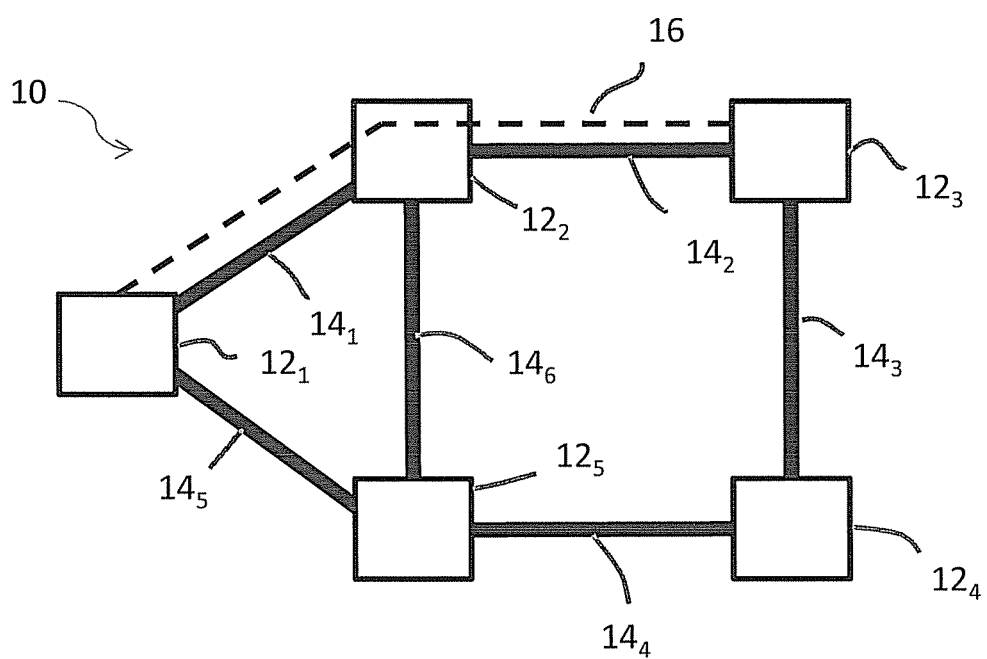
FIG. 1 is a schematic drawing of an optical network topology in which the present invention may be employed.

FIG. 1 shows an example of an optical network 10 with optical network elements $12_1$ to $12_5$ that are interconnected by network links $14_1$ to $14_6$. The links $14_1$ to $14_6$ denote which of the optical network elements $12_1$ to $12_5$ are interconnected in the optical network 10.

FIG. 1 shows an example of a small network, but this is merely for illustration purposes, and in general the optical network 10 can comprise any number of optical network elements 12 and corresponding links 14.

An example of an optical path or light path 16 that comprises the optical network elements $12_1$, $12_2$ and $12_3$ and network links $14_1$ and $14_2$ is shown in broken lines in FIG. 1. The optical network links, such as the links $14_1$ and $14_2$ generally degrade the signal quality, which can be measured in terms of an optical performance metric such as the optical signal to noise ratio (OSNR). The light path 16 is considered to be feasible if an optical performance metric is maintained below a given threshold, indicating that the degradation of the optical signal is sufficiently small to allow for correct detection of the optical signal. Otherwise, the light path is assumed to be unfeasible, and 3R regeneration can be provided in an intermediate node to enhance the signal quality.

Optical performance estimation to distinguish between feasible and unfeasible light paths involves the assessment of the quality of the data channel and depends on various aspects such as the length and the type of optical fibers, the number and type of the optical network links traversed, the bit rate or the modulation format. The complexity of the optical performance evaluation usually requires large computational and storage resources. This provides a particular challenge in situations in which a network fault occurs, such as due to a cut in an optical fiber, and re-routing has to be performed quickly to restore the network operation, or when a new service needs to be quickly established. Alternatively, all feasible light paths may be computed in advance, thus avoiding time-consuming online computations in the re-routing process. However, the main disadvantage of the latter approach is that it may require maintaining a large set of data comprising all feasible light paths in the network for both offline and online applications. Exploiting this large data set in online applications can also be time-consuming.

The invention according to the preferred embodiment proposes a solution that assigns performance indicators to the objects, in particular the links of a network by means of an optimization computation, in particular by means of linear optimization. This results in a compression of the optical channel performance information that allows to evaluate the feasibility of an optical light path 16 in the network 10 simply by summing up the performance indicators of the optical network objects, such as along the network links $14_1$ and $14_2$ along the light path 16, and comparing the sum with a threshold value that is a parameter in the linear optimization.

Figure 2:
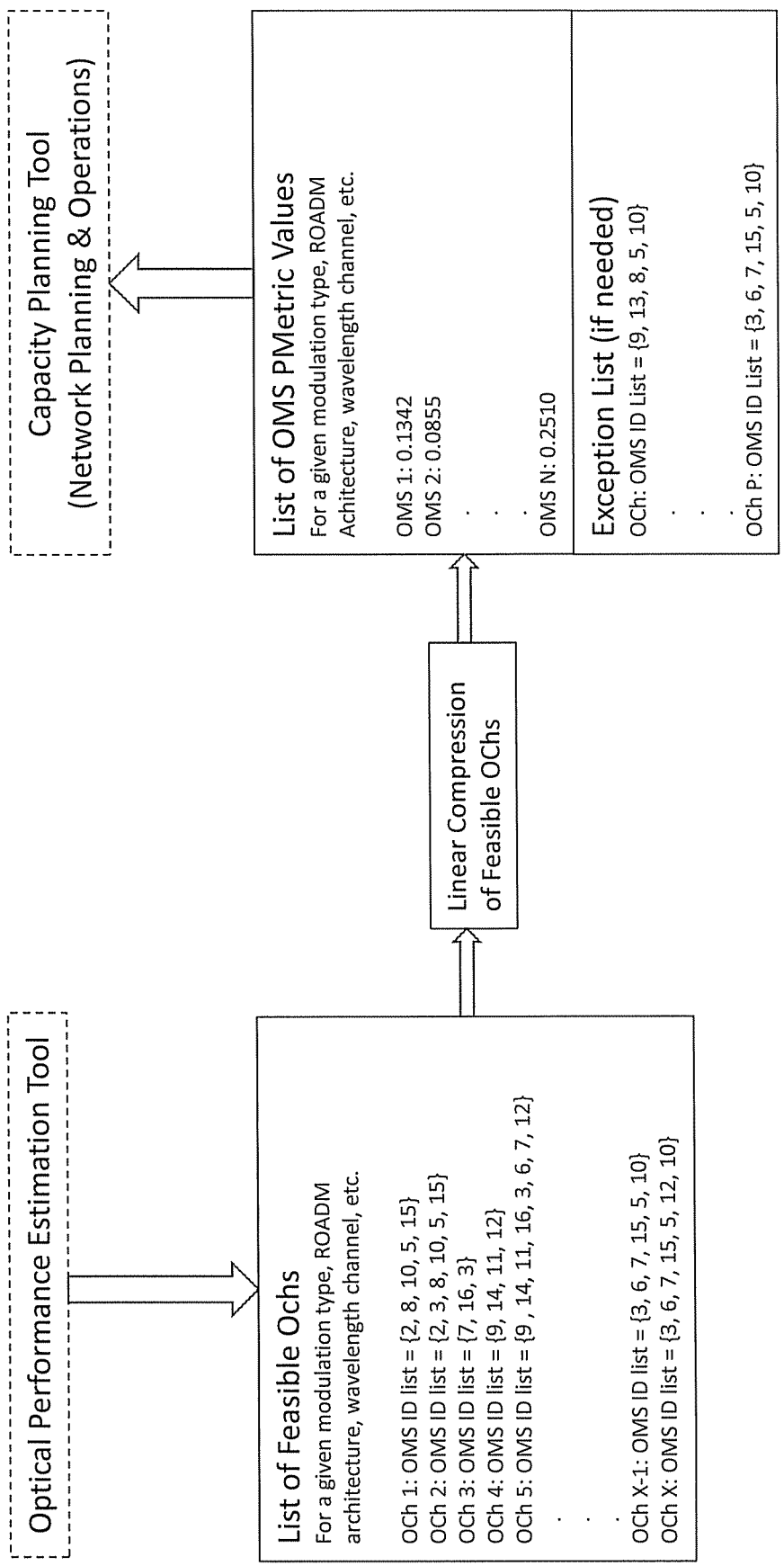
FIG. 2 is a diagram showing the operation principle of a method of assigning performance indicators to objects of the network according to an embodiment of the invention.

FIG. 2 is a high-level diagram that illustrates the idea underlying the invention. An optical performance estimation tool, such as TransNet, may be employed to determine all the feasible light paths in the network 10. Feasibility may be determined based on a pre-defined criterion, such as optical signal to noise ratio (OSNR). Such optical performance estimation tools are generally known in the art, and hence a detailed description is omitted.

The optical performance estimation may yield a list of X feasible optical channels OChs 1 to X in the network.

The feasible optical channels OCh 1 to OCh X may be given in terms of ordered collections of network objects, in this case ordered collections of optical multiplexing sections (OMS), which denote the sections or links between consecutive WDM multiplexers/demultiplexers.

The calculation according to the present invention converts this information into a set of N performance indicators that are attributed to the network objects. Each of the optical multiplexing sections OMS 1 to OMS N may hence be assigned one performance indicator, e.g., one real number.

In addition, there may be an exception list of those P optical channels for which the assignment of performance indicators may not be fully conclusive to decide whether the channel is feasible or not.

The assigned performance indicators (and exception list, if needed) may then be used efficiently to evaluate the performance and feasibility of an optical path in the network during network planning and operations, such as in a capacity planning tool for routing algorithms such as the DIJK-STRA algorithm.

Figure 3:
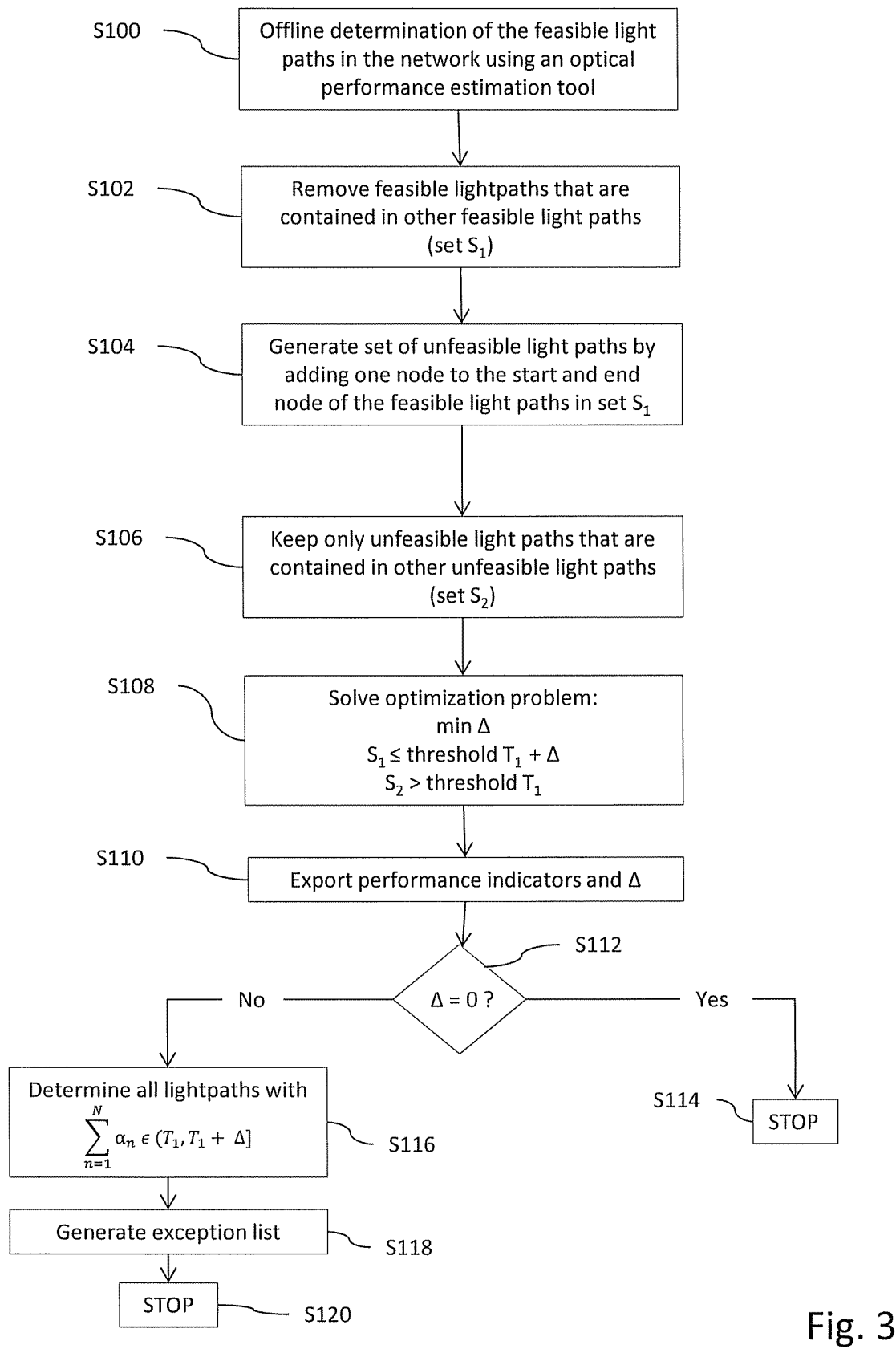
FIG. 3 is a flow diagram illustrating a method of assigning performance indicators to objects of a network according to an embodiment of the invention.

FIG. 3 is a flow diagram that shows an example of how performance indicators may be assigned to objects of a network, such as the optical multiplexing sections or links $14_1$ to $14_6$ by means of linear optimization.

In a first step S100, all the feasible light paths in the optical network 10 are determined by means of an optical performance estimation tool. As described above with reference to FIG. 2, any conventional optical performance estimation tool, such as TransNet, may be employed for that purpose. Depending on the size and characteristics of the network and depending on the feasibility criterion, a determination of the feasible light paths may require significant computational resources. However, this is not a major concern, since step S100 may be executed offline as part of the network planning, or as a background process when the network is operating.

In a subsequent step S102, those feasible light paths that are contained in other feasible light paths are removed from the set of feasible light paths in step S100. This will yield a first set of light paths in said network, which will henceforth be denoted set $S_1$. The set $S_1$ may alternatively be characterized as the set containing the longest feasible light paths.

For instance, referring to the example given in FIG. 1 and assuming that the light path 16 comprising of the optical network links $14_1$ and $14_2$ (as well as the network elements $12_1$, $12_2$ and $12_3$) is feasible, the same will generally be true for subsections of the light path 16, such as the light path comprising only the link $14_1$ and the optical network elements $12_1$ and $12_2$. This is because additional network objects usually introduce additional signal distortions. Hence, a subsection of a feasible light path 16 will usually experience a lesser degree of signal degradation and hence will likewise be feasible. In step S102, the feasible light path consisting of the optical link $14_1$ and the optical network elements $12_1$ and $12_2$ would be removed from the set of feasible light paths, since it is fully contained in the optical path 16 that is likewise feasible. Removing the feasible light paths that are contained in other feasible light paths excludes redundant light paths, thereby simplifying the computation.

Based on set $S_1$ of the longest feasible light paths, a set of unfeasible light paths is generated in step S104 by adding one network object, in particular one network link, to the start node of the feasible light paths in set $S_1$ and by adding one network object, in particular one network link to the end node of the feasible light paths. Cycles are avoided, i.e. optical objects that are already in the light path are not considered as possible extensions.

Figure 4A:
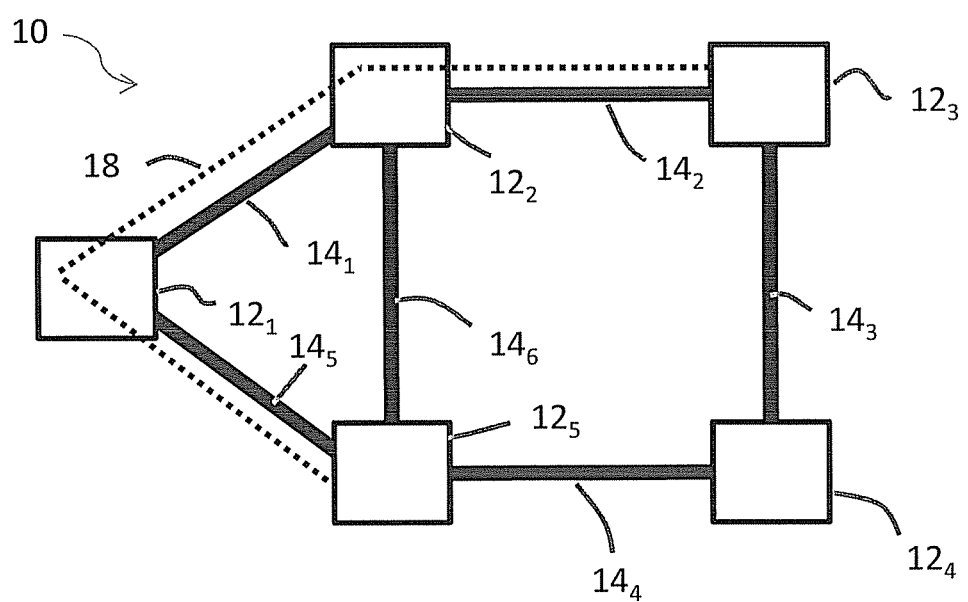
FIGS. 4a and 4b illustrate how unfeasible optical paths may be generated from feasible optical paths in a step in the flow diagram of FIG. 3.
Figure 4B:
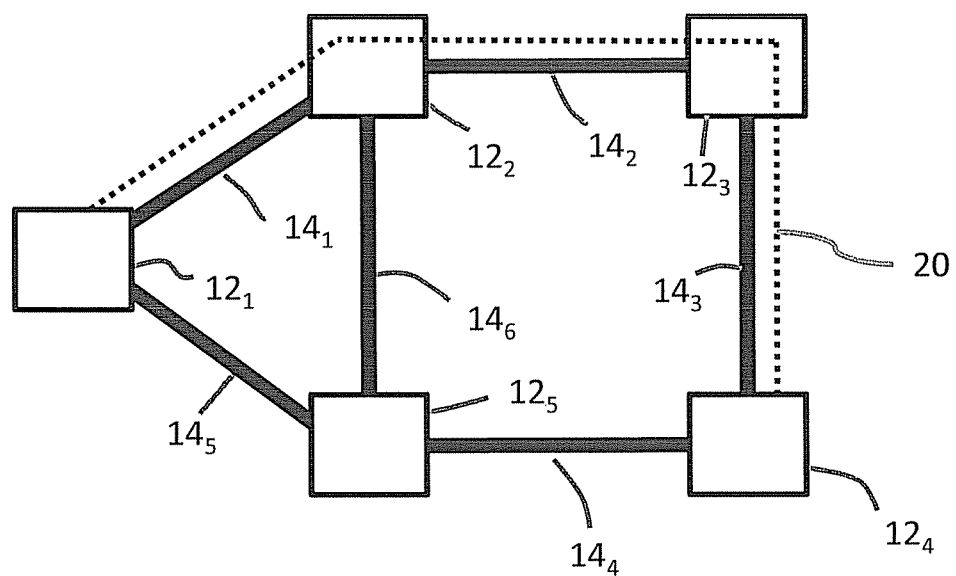

Generation of the set of unfeasible light paths in step S104 is illustrated in FIGS. 4a and 4b for the network configuration of FIG. 1.

The feasible light path 16 shown in FIG. 1 has the start node $12_1$ and the end node $12_3$. Assuming that the light path 16 has no feasible extensions and hence is a longest feasible light path contained in set $S_1$, an extension from the start node $12_1$ to node $12_5$ via the additional link $14_5$ will result in an unfeasible light path 18, as shown in FIG. 4a.

Similarly, extending the feasible light path 16 from the end node $12_3$ to node $12_4$ via the additional link $14_3$ will result in another unfeasible light path 20, as shown in FIG. 4b.

In a subsequent step S106, among the set of unfeasible light paths determined in step S104, only those unfeasible light paths that are contained in other unfeasible light paths are kept. The resulting subset of unfeasible light paths is denoted set $S_2$. The set $S_2$ may be characterized as the set containing the shortest unfeasible light paths, in the sense that the light paths in the set $S_2$ become feasible if they are shortened by just one network object, in particular by just one network link.

Based on the set $S_1$ and $S_2$ a linear optimization problem can be formulated as follows:

$$\min \Delta \quad (2)$$

$$\left\{ p \in S_1 \mid p = \{p_1, \ldots, p_N\}, \sum_{n=1}^{N} \alpha_n \leq T_1 + \Delta \right\}$$

$$\left\{ q \in S_2 \mid q = \{q_1, \ldots, q_M\}, \sum_{m=1}^{M} \alpha_m > T_1 \right\}$$

In Equation (2), p denotes a light path in the set $S_1$, which is given as an ordered tuple $\{p_1, \ldots, p_N\}$ of interconnected network objects $p_n$ that are traversed by an optical signal in this order. The parameters $\alpha_n$ denote performance indicators, which are real-valued numbers assigned to the network objects $p_n$. The parameter $T_1$ denotes a threshold value. Similarly, q denotes a light path in the set $S_2$, which are again given as an ordered tuple $q=\{q_1, \ldots, q_M\}$. The objective function $\Delta$ should be minimized, so to allow for the sharpest possible separation between the sets $S_1$ and $S_2$. The threshold value $T_1$ is a scaling parameter that can be fixed in advance, such as $T_1=1$. Equation (2) is a more complete representation of Equation (1), which describes the same optimization problem in a shorthand notation.

This optimization problem may be solved by means of standard techniques from linear optimization theory, and yields a set of real-valued performance indicators $\alpha_n$, wherein a performance indicator is attributed to each object of the network, in particular each link of the network. The optimization further yields the objective function $\Delta$ (step S110).

As indicated in step S112, we can now distinguish two different cases. Ideally, $\Delta=0$. In this case, the optimization yields performance indicators that allow to distinguish completely between the feasible light paths and the unfeasible light paths simply by adding up the performance indicators $\alpha_n$ along the respective light path. In case $\Sigma_n \alpha_n \leq T_1$, the respective light path is feasible, and otherwise the light path is unfeasible. In this case, no further steps are required, and the algorithm stops at step S114.

The $\Delta=0$ case corresponds to a lossless compression. An evaluation of the feasibility of an optical path can be fully reduced to a calculation of a sum of performance indicators $\alpha_n$. Hence, only the performance indicators $\alpha_n$ need to be stored for network planning and operations.

Figure 5:
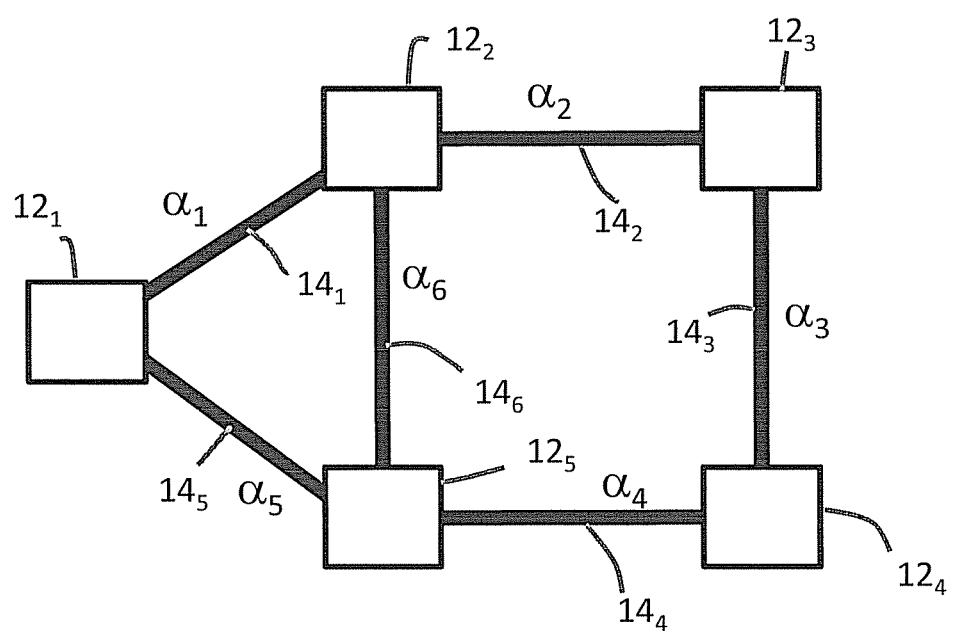
FIG. 5 illustrates how performance indicators are assigned to network objects for the network topology of the example of FIG. 1.

FIG. 5 shows how, as a result of the optimization algorithm according to the preferred embodiments, performance indicator values $\alpha_1, \alpha_2, \alpha_3, \alpha_4, \alpha_5, \alpha_6$ are attributed to each one of the network links $14_1$ to $14_6$, respectively, for the optical network 10 of FIG. 1. Only these performance indicators $\alpha_n$ need to be stored in order to allow the performance of an optical path to be evaluated. This is a significant advantage over prior art techniques that require to store a list of all feasible light paths, in particular for large networks.

Otherwise, if $\Delta \neq 0$, the outcome of the optimization algorithm does not allow to distinguish conclusively between feasible and unfeasible light paths. If $\Sigma_n \alpha_n \leq T_1$, the light path is feasible. If $\Sigma \alpha_n > T_1 + \Delta =: T_2$, the light path is unfeasible. However, if $\Sigma_n \alpha_n$ is in between the first threshold value $T_1$ and a second threshold value $T_2 = T_1 + \Delta$, the decision whether the respective light path is feasible or unfeasible cannot be made conclusively. These light paths can be stored in an exception list to which the user may revert during network planning and operations. In order to create the exception list, in step S116 all light paths are determined for which the sum of the respective performance indicators falls in the interval $(T_1, T_1 + \Delta]$. The feasible light paths in the set may then be determined by comparison with the set of feasible light paths determined in step S100. These light paths constitute the exception list (step S118). The algorithm then ends in step S120.

In summary, the optimization according to the preferred embodiment yields a set of performance indicators $\alpha_n$ assigned to the network objects, a maximum error $\Delta$, and (if needed) an exception list. The outcome of the optimization may result in two possible scenarios:

(i) Lossless compression, i.e., $\Delta=0$: In case the linear compression returns no exceptions, the obtained performance indicators enable to retrieve all feasible light paths and exclude all the unfeasible light paths by comparison of the sum of performance indicators $\Sigma_n \alpha_n$ of the respective light path with the threshold value $T_1$.

(ii) Lossy compression, i.e., $\Delta \neq 0$: In case a linear compression returns exceptions, the performance indicators do not allow to simultaneously recover all feasible light paths and exclude all the unfeasible ones. However, the optimization method minimizes $\Delta$, and hence the number of exceptions. The optimization is conservative in that a given light path is guaranteed to be feasible if the sum of the respective performance indicators is below the first threshold value $T_1$. However, only if the sum of the performance indicators is above the second threshold $T_2=T_1+\Delta$, the light path is guaranteed to be unfeasible. If the sum of the performance indicators is in between the first threshold $T_1$ and the second threshold $T_2=T_1+\Delta$, the light path could be either feasible or unfeasible, and a search in the exception list is required to decide this.

The method illustrated in the flow diagram of FIG. 3 can be implemented as a computer program that receives the network topology and the list of feasible light paths calculated in an optical performance estimation tool, and manipulates that list in order to generate the sets $S_1$ and $S_2$. For the linear optimization method, both linear programming and integer linear programming models can be used and solved using a conventional server, such as Gurobi, CPLEX, LPsolver, or MATLAB.

Heuristic algorithms may also be employed for this step. The performance indicator values $\alpha_n$ obtained in the optimization method may then be employed together with a standard routing algorithm, such as Dijkstra or k-shortest path to create an exception list if necessary.

The inventors tested the method as described above with reference to the flow diagram of FIG. 3 for several real-world networks, and found that very often the optimization yields $\Delta=0$, and hence no exception list is required. Even in the cases $\Delta \neq 0$ where an exception list is required, the inventors found that it is usually rather short and comprises less than 5% of the feasible light paths. Hence, even with the exception list taken into account, the invention results in a significant simplification both in terms of online computational resources and storage resources.

Figure 6:
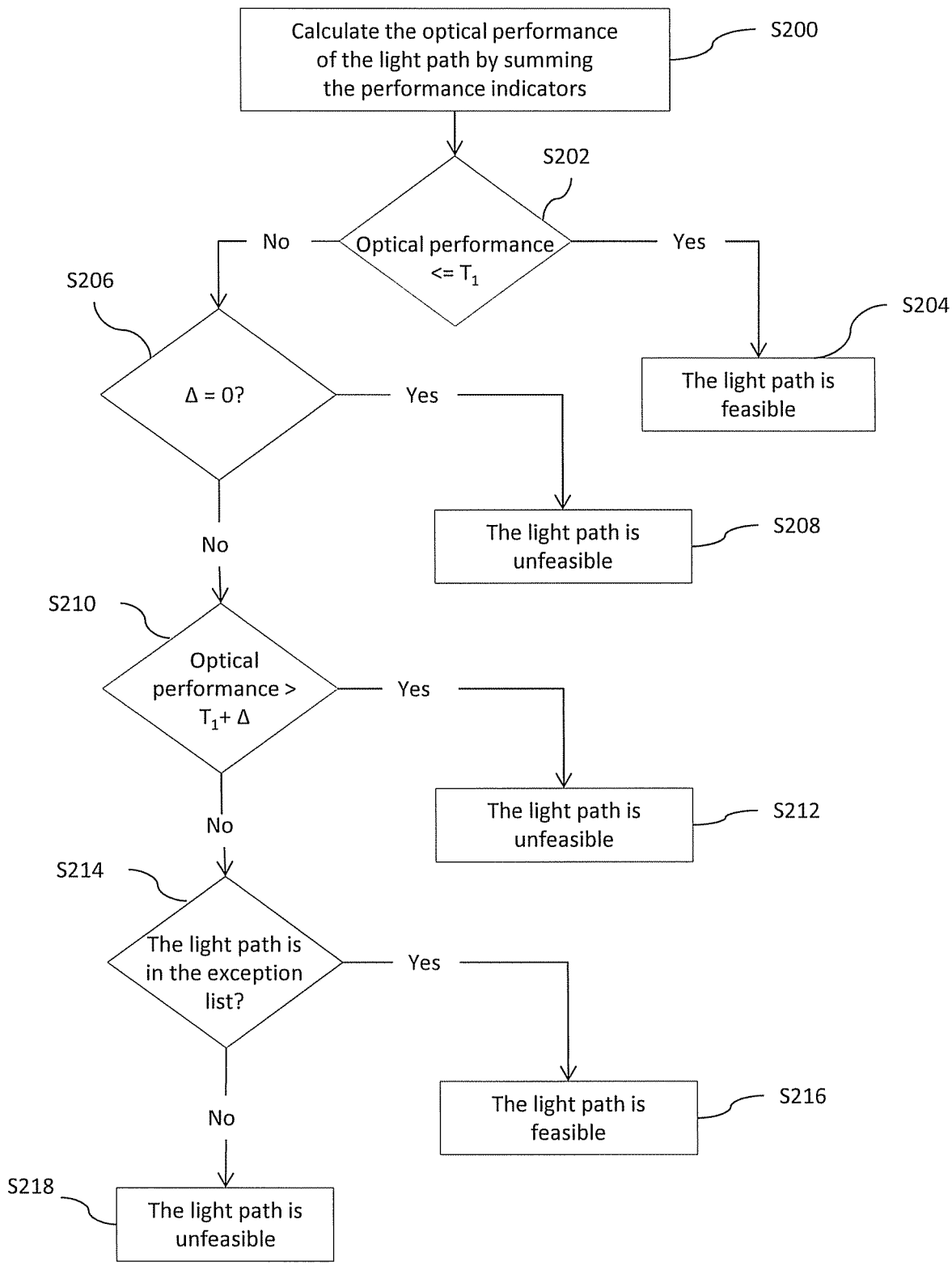
FIG. 6 is a flow diagram that illustrates a method of evaluating the performance of a path in a network according to an embodiment of the invention.

FIG. 6 is a flow chart that shows in additional detail how the performance indicator values may be employed to check the feasibility or unfeasibility of a given light path according to an embodiment of the present invention.

In step S200, an optical performance of the given light path is calculated by summing up the performance indicator values $\alpha_n$ of the optical objects along the given light path, $\Sigma_n \alpha_n$.

In step S202, the optical performance is compared with the threshold value $T_1$. In case $\Sigma_n \alpha_n \leq T_1$, the light path is known to be feasible (step S204).

If, on the other hand, $\Sigma_n \alpha_n > T_1$, feasibility or unfeasibility of the light path depends on the obtained error quantity $\Delta$ (step S206).

If $\Delta=0$, the light path is unfeasible (step S208).

If, on the other hand, $\Delta \neq 0$, the method proceeds in step S210 with a comparison of the optical performance $\Sigma \alpha_n$ with the second threshold value $T_2=T_1+\Delta$. If $\Sigma_n \alpha_n > T_1+\Delta$, the light path is unfeasible (step S212).

If, on the other hand, the optical performance $\Sigma_n \alpha_n \leq T_1+\Delta$, reference is made to the exception list (step S214). If the respective light path is contained in the exception list, the light path is determined feasible in step S216. Otherwise, the light path is unfeasible (step S218).

For the performance evaluation method illustrated in the flow diagram of FIG. 6, a computer program implemented in the planning tool or in the control plane may be used. The evaluation method can be integrated into a routing algorithm such as DIJKSTRA that employs the performance indicators as weights for the nodes and edges of the graph that represents the network.

An important implementation of the method is in the control plane, as the method allows a quick evaluation of the feasibility of a light path while maintaining the best optical performance calculated with the optical performance estimation tool. The major advantages of the method are simplicity, scalability and accuracy.

Simplicity is achieved by avoiding over-engineering in the network planning and operation ecosystem. This may be achieved by keeping the optical performance details in the network planning tools, such as TransNet, rather than propagating the complexity of models and parameters to higher layer planning and operation tools. As a result, the cost of maintaining the overall system may be significantly reduced.

Scalability is achieved by the reduction of the amount of data handed over between the tools. The invention facilitates the importing and maintaining of data for multiple optical channel types, as well as multi-layer planning and operation of very large networks and generalized multi-protocol label switching (GMPLS) impairment-aware routing.

Accuracy is achieved by preserving the high quality of the offline determination of the feasible light paths. In case of lossless compression or inclusion of the exception list, the most accurate optical performance estimation is fully kept, and there is no need to compromise accuracy by simplifications of the performance model. This may be particularly relevant to avoid degrading of tender planning results with upcoming channel formats, such as 16QAM.

In the example described above with reference to FIGS. 1 to 6, the network links $14_1$ to $14_6$ were considered network objects which degrade the signal quality and to which performance indicators $\alpha_1$ to $\alpha_6$ are assigned. However, this is merely an example. In other configurations, the optical network elements $12_1$ to $12_5$ may be considered network objects that degrade the signal quality, and performance indicators may be assigned to the network elements $12_1$ to $12_5$, either additionally or instead of the network links $14_1$ to $14_6$.

The description of the preferred embodiments and the figures merely serve to illustrate the invention, but should not be understood to imply any limitation. The scope of the invention is to be determined based on the appended claims.

The invention claimed is:

1. A method for a network, comprising:
   determining, using at least one computational resource executing instructions stored on at least one non-transitory, computer-readable storage media, a first set of paths in said network, each path in said first set of paths comprising a plurality of interconnected objects of said network, wherein said first set of paths comprises paths that satisfy a predetermined criterion related to network path performance;

determining, using said at least one computational resource, a second set of paths in said network, each path in said second set of paths comprising a plurality of interconnected objects of said network, wherein said second set of paths comprises paths that do not satisfy said predetermined criterion;

assigning, using said computational resource, performance indicators to said objects of said network using a computation;

storing said performance indicators; and establishing routing for said network, based at least in part on a plurality of said stored performance indicators, in at least one of planning said network and operating said network;

wherein the performance indicators include performance indicators assigned by said assigning step to objects along a given path, and said computation is based on said first set of paths and said second set of paths such that a sum of said performance indicators assigned by said assigning step to objects along said given path in relation to a first threshold value indicates at least one of:

whether said given path satisfies said predetermined criterion, whether said given path does not satisfy said predetermined criterion;

wherein said computation comprises a linear optimization that results in a compression having, relative to said first set of paths and said second set of paths, at least one of:

a maximum error that is minimized, no error.

2. The method according to claim 1, wherein said given path satisfies said predetermined criterion if said sum of performance indicators is one of:

below said first threshold value, above said first threshold value.

3. The method according to claim 1, wherein said given path does not satisfy said predetermined criterion if said sum of performance indicators is one of:

above said first threshold value, below said first threshold value.

4. The method according to claim 1, further comprising a step of determining a second threshold value using a computation, wherein a sum of performance indicators assigned by said assigning step to objects along a given path indicates one of in relation to said first threshold value, whether said given path satisfies said predetermined criterion, and in relation to said second threshold value, whether said given path does not satisfy said predetermined criterion, in relation to said first threshold value, whether said given path does not satisfy said predetermined criterion, and in relation to said second threshold value, whether said path satisfies said predetermined criterion.

5. The method according to claim 1, wherein said first set of paths is a set of paths that each, when extended in said network, fails to satisfy said predetermined criterion.

6. The method according to claim 1, wherein said second set of paths is a set of paths that each, when shortened in said network, satisfies said predetermined criterion.

7. The method according to claim 1, wherein said computation is of the form min $\Delta$ $\Sigma_n \alpha_n \leq T_1 + \Delta$, $\Sigma_m \alpha_m > T_1$, wherein $\{\alpha_n\}$ denotes a set of said performance indicators attributed to objects $\{1, \ldots, N\}$, wherein said sum $\Sigma_n \alpha_n$ is over all paths in said first set of paths, and wherein said sum $\Sigma_m \alpha_m$ is over all paths in said second set of paths, and wherein $T_1$ denotes said first threshold.

8. The method according to claim 1, wherein said step of establishing routing for said network comprises restoring an interrupted service on said network.

9. The method according to claim 1, wherein said step of establishing routing for said network comprises establishing a new service on said network.

10. A method of evaluating a performance of a path in a network having objects, said path comprising an interconnected plurality of said objects of said network, said method comprising the following steps:

accessing, using a computational resource operative to execute instructions stored in at least one non-transitory, computer-readable storage media, at least two performance indicators stored among a plurality of stored performance indicators assigned to said objects of said network, each of said at least two performance indicators being assigned to a respective object among said interconnected plurality of said objects of said network;

calculating, using said computational resource, a sum of said at least two of performance indicators;

evaluating, using said computational resource, a performance of said path by comparing, against a first threshold value, said sum of said at least two performance indicators; and at least one of planning said network and operating said network, based at least in part on said step of evaluating said performance of said path;

wherein each of said plurality of performance indicators is assigned, to a respective one of said objects of said network, using a computation that is based on a first set of paths in said network and a second set of paths in said network;

wherein each path in said first set of paths comprises a plurality of interconnected objects of said network, and wherein said first set of paths comprises paths that satisfy a predetermined criterion related to network path performance;

wherein each path in said second set of paths comprises a plurality of interconnected objects of said network, and wherein said second set of paths comprises paths that do not satisfy said predetermined criterion;

wherein said computation is operative to, for purposes of said step of evaluating, maximize a number of paths, among a third set of paths comprising said first set of paths and said second set of paths, with respect to each path of which a sum of said performance indicators of objects along said path under consideration, in relation to a first threshold value, indicates at least one of:

whether said path under consideration satisfies said predetermined criterion, whether said path under consideration does not satisfy said predetermined criterion.

11. The method according to claim 10, wherein said step of evaluating said performance comprises a step of comparing said sum against said first threshold value to determine at least one of:

whether said path satisfies a predetermined criterion, whether said path does not satisfy said predetermined criterion.

12. The method according to claim 10, wherein said step of evaluating said performance comprises a step of comparing said sum against a second threshold value to determine at least one of:

whether said path does not satisfy said predetermined criterion, whether said path satisfies said predetermined criterion.

13. The method according to claim 12, wherein said step of evaluating said performance of said path comprises a step of reverting to a performance listing if said sum is between said first threshold value and said second threshold value.

14. The method according to claim 10, wherein said step of at least one of planning said network and operating said network comprises at least one of:
  restoring an interrupted service on said network,
  establishing a new service on said network.

15. A system for a network having a plurality of objects, comprising:
  network equipment for routing communications along a given path, said given path comprising an interconnected plurality of said objects of said network;
  at least one computational resource operative to execute instructions stored on at least one non-transitory computer-readable storage media so as to cause said at least one computing resource to perform operations for routing communications within said network, said operations comprising:
    determining a first set of paths in said network that each satisfies a predetermined criterion related to network path performance, each path of said first set of paths comprising an interconnected plurality of said objects of said network;
    determining a second set of paths in said network that each do not satisfy said predetermined criterion, each path of said second set of paths comprising an interconnected plurality of said objects of said network; and
    assigning a plurality of performance indicators to said objects of said network such that each object of said objects of said network is assigned a respective one of said plurality of performance indicators using a computation that is based on said first set of paths and said second set of paths; and
      establishing routing for said network, based at least in part on a sum of performance indicators of said plurality of performance indicators to determine at least one of:
        whether said given path satisfies a predetermined criterion,
        whether said given path does not satisfy said predetermined criterion;
  wherein said computation is operative to, for purposes of said step of establishing, minimize a number of paths, among a third set of paths comprising said first set of paths and said second set of paths, with respect to each path of which a sum of said performance indicators of said objects of said network along said path under consideration, in relation to a first threshold value, does not indicate at least one of:
    whether said path under consideration satisfies said predetermined criterion,
    whether said path under consideration does not satisfy said predetermined criterion.

16. The system according to claim 15, wherein said step of establishing routing for said network comprises at least one of:
  restoring an interrupted service on said network,
  establishing a new service on said network.

17. The system according to claim 15, wherein said computation is of the form
  min $\Delta$
  $\Sigma_n \alpha_n \leq T_1 + \Delta$, $\Sigma_m \alpha_m > T_1$,
  wherein $\{\alpha_n\}$ denotes a set of said plurality of performance indicators attributed to objects $\{1, \ldots, N\}$, wherein said sum $\Sigma_n \alpha_n$ is over all paths in said first set of paths, and wherein said sum $\Sigma_m \alpha_m$ is over all paths in said second set of paths, and wherein $T_1$ denotes said first threshold.

18. A system for evaluating a performance of a path in a network having objects, said path comprising an interconnected plurality of said objects of said network, said system comprising:
  at least one non-transitory, computer-readable storage media having instructions stored thereon;
  at least one computational resource operative to execute said instructions, causing said at least one computational resource to perform operations for routing communications within said network, said operations comprising:
    calculating a sum of performance indicators for said interconnected plurality of objects along said path, said performance indicators belonging to a larger plurality of performance indicators that are each assigned to a respective object among said objects of said network;
    determining whether to route communications along said path based at least in part on a comparison of said sum against a first threshold value; and
    establishing routing for said network based at least in part on said determination;
  wherein said larger plurality of performance indicators are assigned to said objects of said network using a computation that is based on a first set of paths in said network and a second set of paths in said network;
  wherein each path in said first set of paths comprises an interconnected plurality of said objects of said network, and wherein said first set of paths comprises paths that satisfy a predetermined criterion related to network path performance;
  wherein said path in said second set of paths comprises an interconnected plurality of said objects of said network, and wherein said second set of paths comprises paths that do not satisfy said predetermined criterion;
  wherein a sum of performance indicators assigned to said objects of said network along a given path of said network in relation to a first threshold value indicates at least one of:
    whether said given path satisfies said predetermined criterion,
    whether said given path does not satisfy said predetermined criterion;
  wherein said computation comprises a linear optimization that results in a compression that is, relative to said first set of paths and said second set of paths, one of
  lossy with a minimized objective function,
  lossless.

19. The system according to claim 18, wherein said computation is of the form
  min $\Delta$
  $\Sigma_n \alpha_n \leq T_1 + \Delta$, $\Sigma_m \alpha_m > T_1$,
  wherein $\{\alpha_n\}$ denotes a set of said plurality of performance indicators attributed to objects $\{1, \ldots, N\}$, wherein said sum $\Sigma_n \alpha_n$ is over all paths in said first set of paths, and wherein said sum $\Sigma_m \alpha_m$ is over all paths in said second set of paths, and wherein $T_1$ denotes said first threshold.

20. One or more non-transitory, computer-readable storage media having instructions stored thereon, that when executed by one or more computing resource, cause the one or more computing resource to perform operations for routing communications within a network, said operations comprising:

determining a first set of paths in said network that each satisfies a predetermined criterion, said network having objects and each path of said first set of paths comprising an interconnected plurality of said objects of said network;

determining a second set of paths in said network that each do not satisfy said predetermined criterion, each path of said second set of paths comprising an interconnected plurality of said objects of said network;

assigning a plurality of performance indicators to said objects of said network such that each object of said objects of said network is assigned a respective one of said plurality of performance indicators using a computation that is based on said first set of paths and said second set of paths; and establishing, in at least one of planning said network and operating said network, routing for said network based at least in part on at least one performance indicator, selected from said plurality of performance indicators, to determine at least one of:

whether a given path of said network associated with said at least one performance indicator satisfies a predetermined criterion related to network path performance, whether said given path of said network associated with said at least one performance indicator does not satisfy said predetermined criterion; wherein said computation comprises an optimization operative to, for purposes of said step of establishing, maximize a number of paths, among a third set of paths comprising said first set of paths and said second set of paths, with respect to each path of which a sum of said performance indicators of objects along a said path under consideration, in relation to a first threshold value, indicates at least one of:

whether said path under consideration satisfies said predetermined criterion, whether said path under consideration does not satisfy said predetermined criterion.

* * * * *